US008220135B2

(12) United States Patent
Vogel et al.

(10) Patent No.: US 8,220,135 B2

(45) Date of Patent: Jul. 17, 2012

(54) COMPOUND TOOL WITH SCREWDRIVER ATTACHMENT

(75) Inventors: Ron Vogel, Camarillo, CA (US); Garrick Sillers, Thousand Oaks, CA (US)

(73) Assignee: T3 Innovation LLC, Camarillo, CA (US)

(*) Notice: Subject to any disclaimer, the term of this patent is extended or adjusted under 35 U.S.C. 154(b) by 526 days.

(21) Appl. No.: 12/479,618

(22) Filed: Jun. 5, 2009

(65) Prior Publication Data

US 2010/0306990 A1 Dec. 9, 2010

(51) Int. Cl.
*B23P 23/00* (2006.01)
*H01R 43/042* (2006.01)

(52) U.S. Cl. ................. 29/566.4; 29/750; 7/108; 7/901; 279/144; 279/89; 81/438; 81/439

(58) Field of Classification Search ................. 29/566.4, 29/33 M, 750, 758, 270, 278; 7/107, 108, 7/168, 901; 81/438, 439; 279/144, 143, 279/89, 93, 79
See application file for complete search history.

(56) References Cited

U.S. PATENT DOCUMENTS 2,937,669 A * 5/1960 Lemke .............................. 7/108
3,843,143 A * 10/1974 Laxson ......................... 279/144
3,883,316 A * 5/1975 Mason ......................... 29/566.4
4,161,061 A * 7/1979 Mason et al. ................ 29/566.4
4,241,496 A * 12/1980 Gregson ....................... 29/566.4
5,175,921 A * 1/1993 Krietzman .................. 29/566.4
5,195,230 A 3/1993 Krietzman
5,604,948 A 2/1997 McMahon et al.
5,813,109 A 9/1998 Ziegler et al.
6,351,865 B1 3/2002 De Donato
6,615,480 B1 9/2003 Murphy
6,625,867 B2 9/2003 Jonker
6,874,791 B2 4/2005 Chen et al.
7,225,490 B1 * 6/2007 Yen .................................. 7/107
7,621,040 B2 * 11/2009 Sullivan .......................... 29/750
7,788,788 B2 * 9/2010 Sullivan ....................... 29/566.4
2007/0044596 A1 * 3/2007 Chen .............................. 81/438

OTHER PUBLICATIONS

TelephoneStuff.com, Fluke Networks Adapter Blade, Model #10051-300, accessed on May 21, 2010, http://www.telephonestuff.com/catalog/model_10051-300.htm?popup=1.

* cited by examiner

*Primary Examiner* — Erica E Cadugan

(74) *Attorney, Agent, or Firm* — SoCal IP Law Group LLP; Steven C. Sereboff; Yang S. Pak

(57) ABSTRACT

There is disclosed an impact termination tool, a receiver for an impact termination tool, and a work end adapter for an impact termination tool. The work end adapter is adapted to receive standard tool bits and standard finned shaft tips. The impact termination tool is adapted to receive standard impact termination blades and to receive the work end adapter. When installed in the impact termination tool, the work end adapter rotates only with the impact termination tool, and will not rotate independently of the impact termination tool. The impact termination tool has a spring-loaded impact mechanism and a lock-out button to prevent the tool's impact mechanism from operating.

15 Claims, 5 Drawing Sheets

COMPOUND TOOL WITH SCREWDRIVER ATTACHMENT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to compound tools with screwdriver attachments.

2. Description of the Related Art

Telephone linemen have long employed impact termination tools for installing and terminating electrical conductors at terminal blocks of telecom equipment installations. These tools are commonly referred to as punch down tools. Punch down tools have a stiff, strong handle to which a blade is attached. Blades are typically double-ended, and the handle has a longitudinal bore in a forward end into which a blade drops. The handle and blades mate so that the blade will stay in place during use. The blades have a tip which conforms with the shape of the terminals on the terminal block. Some blades include a cutting edge so that the wire is simultaneously inserted and trimmed.

To use the punch down tool, a wire is inserted in between the two metal blades on a punch down block and the punch down tool is pressed down on top of the wire and the two blades on the punch down block. Many punch down tools have a spring-loaded impact mechanism which delivers a measured impact blow to the termination blade when the operator applies longitudinal pressure on the handle. This requires a bit of pressure until with an audible snap the wire is stripped and contact made as it is pushed down between the two punch down block blades.

There are two common types of blocks—66 blocks and 110 blocks, and each requires different types of blades. Bix and Krone blocks and blades are also common. Some punch down tools have the blade fixed in the punch down tool, whereas others have a standard-form cavity for use with standard-form blades. Blades are often double-ended, with one end 66 style and the other 110 style. Thus, the standard cavity is typically double-depth to allow for double-ended blades. Most modern punch down tools have a hollow interior on the butt end of the tool to allow storage of another blade. This storage space can be utilized to store both 66 style and 110 style blades.

Because a punch down tool is required for almost any well-equipped telephone lineman or network technician, a variety of punch down tools have become available. To improve efficiency and reduce service overhead, it is generally desirable to integrate as many functions as possible in a given piece of service equipment. Thus, in one variation (e.g., the Harris D914), the punch down tool can be used with a screwdriver adapter in place of a blade so that the punch down tool can be used as a screwdriver. In order to accommodate the rotational (torque) function of driving a screw, the punch down tool and the screwdriver adapters are specially designed to mate together while allowing the handle to continue to be useful as a punch down tool. Also available from Fluke Networks is the Model 10051-300, a ¼" square driver hex bit adapter which allows a Harris D914 punch down tool to be used with ¼" square drive sockets. The Harris D914 has become so popular that other manufacturers (e.g., Fluke Networks) sell compatible tools with the same model designation.

Despite the clear advantages of providing a punch down tool with multiple capabilities, there have been virtually no improvements in about fifteen years. This is not due to a lack of market for punch down tools, absence of technology, or limits on materials. Rather, it is has been due to a lack of creativity on the part of tool designers.

In all of the drawings, a forward end or direction is to the left and the rearward end or direction is to the right.

DETAILED DESCRIPTION

Figure 1:
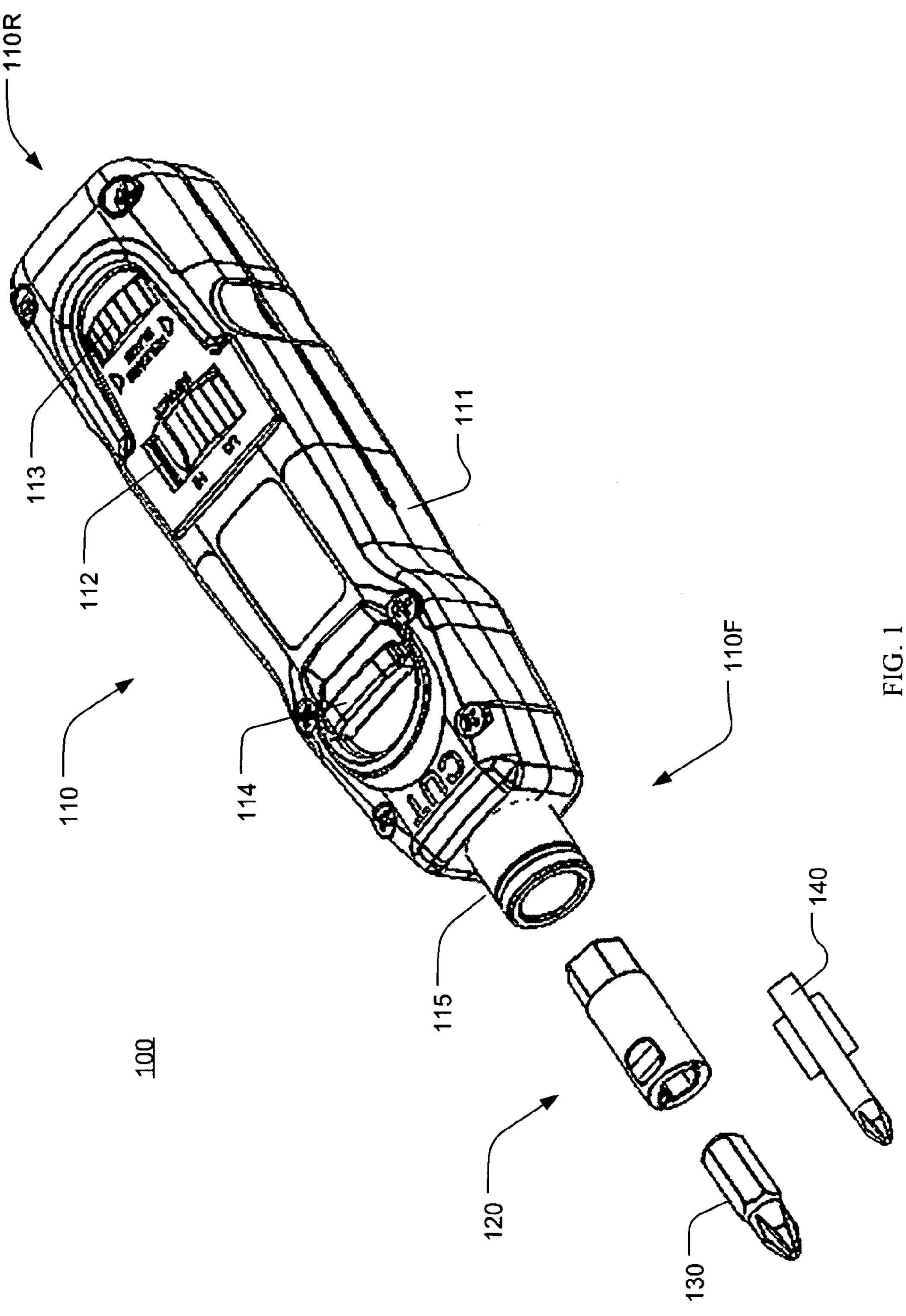
FIG. 1 is an exploded perspective view of a tool system.

Referring now to FIG. 1 there is shown an exploded perspective view of a tool system 100. The tool system includes a punch down tool 110, a work end adapter 120, a hex bit 130 and a winged bit 140. The relative position of various parts of the tool system 100 will be described based upon this view. For example, terms such as top, bottom, left and right are used. However, the tool system 100 may be used in various positions such as upside down. Thus, some descriptive terms are used in relative terms and not absolute terms.

The punch down tool 110 has a forward end 110F and a rearward end 110R. The punch down tool includes an elongate body 111 formed into a hand grip—that is, graspable by a normal human hand. The body 111 may be made from high impact plastic or other rigid, rugged materials. A receiver 115 is secured into the forward end 110F of the punch down tool 110. The receiver 115 is adapted to receive standard 66, 100, Bix and Krone blades—single-ended and double-ended. The receiver may be made from hardened steel or other strong, rigid materials.

The punch down tool 110 may include a hammer assembly (not shown) for delivering an impact to the receiver 115. The punch down tool 110 may include an impact adjustment switch 112 to set the impact between high and low. The punch down tool 110 may include a lockout 114 to prevent the hammer assembly from delivering the impact, and therefore to provide longitudinal rigidity to the hammer assembly.

The lockout 114 may be a flat rigid member having a central hole (not shown). The lockout 114 may be engaged with lateral pressure in one direction and disengaged with lateral pressure in the opposite direction. When engaged, the central hole is off-center of the hammer assembly and thereby prevents the hammer assembly from movement. When disengaged, the lockout 114 may allow the hammer assembly free movement through the central hole.

The punch down tool 110 may include a blade storage cavity (not shown) in the rearward end 110R. A blade release switch 113 may be provided to allow the user to open the cavity for insertion or release of a blade.

The hex bit 130 and the winged bit 140 may have standard configurations and may be Philips screwdriver, bladed screwdriver, hex, torx, square driver, socket, or other ends.

The work end adapter 120 is provided to allow the punch down tool 110 to be used with hex bits and winged bits. Accordingly, the work end adapter 120 fits into the receiver 115, and bits such as the hex bit 130 and the winged bit 140 may be inserted into the work end adapter 120. This provides the punch down tool 110 with near limitless utility. The work end adapter 120 may be made from hardened steel or other materials, and may be cast and/or machined into shape.

The work end adapter 120 or the punch down tool 110 may include a ratchet gear assembly to allow ratcheting use of the tool system 100.

Figure 2A:
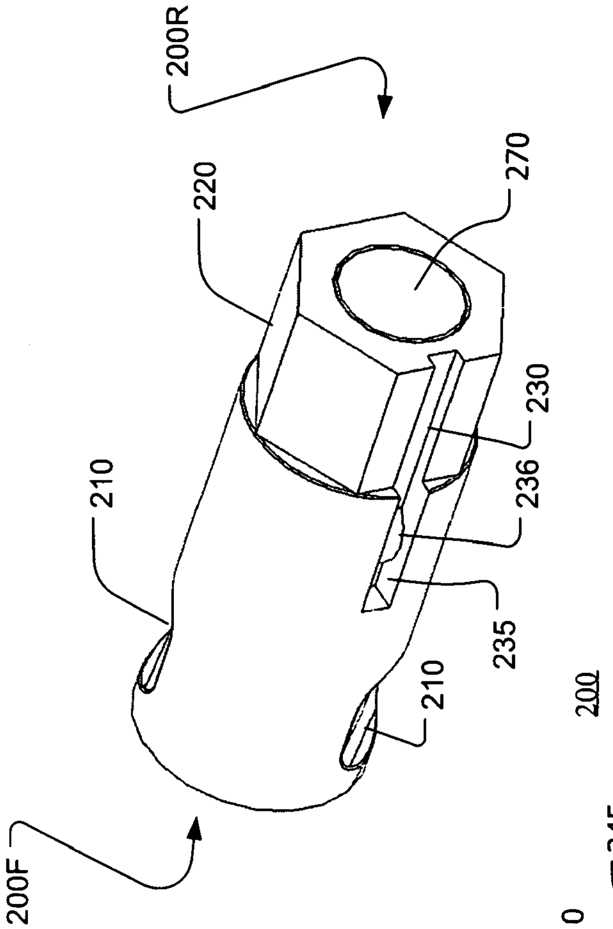
FIG. 2A is a perspective view of a work end adapter.

Referring now to FIG. 2A there is shown a perspective view of a work end adapter 200 which may be the work end adapter 120. The work end adapter 200 has a rigid elongate body having a forward end 200F and a rearward end 200R.

The work end adapter 200 may be generally cylindrical in shape, with a constant diameter $d_w$. The rearward end 200R may have a male coupling 220.

The coupling 220 may have a hexagonal male head having a largest diameter equal to $d_w$. Other non-circular cross-section shapes may be used: regular polygons, irregular polygons, irregular shapes. The shape and size of the coupling 220 may be selected such that when the work end adapter 200 is properly inserted in a complementary coupling of a receiver, the work end adapter 200 will not rotate within the receiver. The coupling 220 need not be male. For example, the work end adapter may have a female coupling, and the receiver provided with a complementary male coupling. Alternatively, the couplings may be male/female hybrids or some other form which allows a good, secure fit over repeated use. The couplings should provide (a) retention of the work end adapter in the receiver, (b) prevent rotation of the work adapter relative to the receiver, and (c) proper orientation of the work end adapter in the receiver. To achieve these goals, the rearward end of the work end adapter should be non-circular and therefore not allow the work end adapter to rotate within the receiver. In this regard, the rearward end may be generally circular but have one or more features which prevent rotation, and in this patent such a configuration is considered to be non-circular.

The rearward end 200R may further include a groove 230 having a depth $d_g$ extending along the outside of the rearward end 200R. The groove may have a substantially constant shape and size along its length. The groove 230 may include a detent portion 235 having a depth $d_d$. The detent portion 235 may be the end of the groove 230 and defined by a bump 236. Alternatively, the detent portion 235 may be in the form of a depression in the groove 230.

The forward end 200F may be provided with finger grips 210. The finger grips 210 may provide a user with an easier hold on the forward end 200F during insertion and/or removal of the work end adapter 200 from a receiver, and during insertion and/or removal of bits from the work end adapter 200.

Figure 2B:
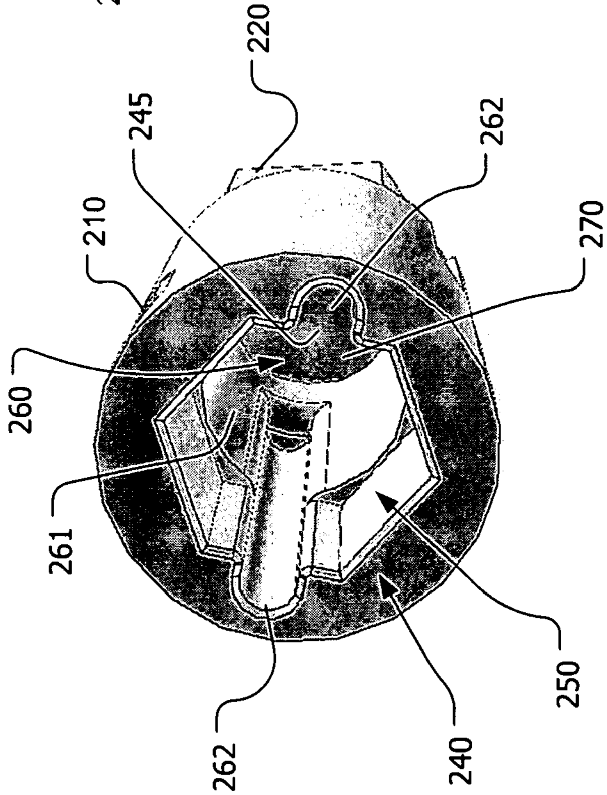
FIG. 2B is a perspective view of a forward end of the work end adapter.

Referring now to FIG. 2B, a perspective view of the forward end 200F is shown. The forward end 200F has a cavity 240 for receiving and securely holding bits. The cavity may include a first portion 250 which may be at least partially coextensive with a second portion 260, and having common centers.

The first portion 250 may be adapted to matingly receive hexagonal bits and accordingly may have a hexagonal cross-section and a depth sufficient for hexagonal bits.

The second portion 260 may be adapted to matingly receive winged shaft bits and accordingly have a central section 261 with a circular cross-section and two opposing ears 262. Because in a winged bit the shaft typically extends well beyond the wings, the central section 261 may extend beyond the ears to a depth substantially at the bottom of the cavity 240. The ears 262 may extend to a depth above the bottom of the cavity 240.

The cavity 240 has a bottom 245 that may be defined by a magnet 270 fitted snugly into the body of the work end adapter 200. The magnet 270 may provide a magnetic field which may be useful for holding parts to the bits inserted into the cavity 240. Alternatively, the cavity 240 may be closed or may extend through the length of the work end adapter 200 from the forward end 200F to the rearward end 200R.

Figure 3:
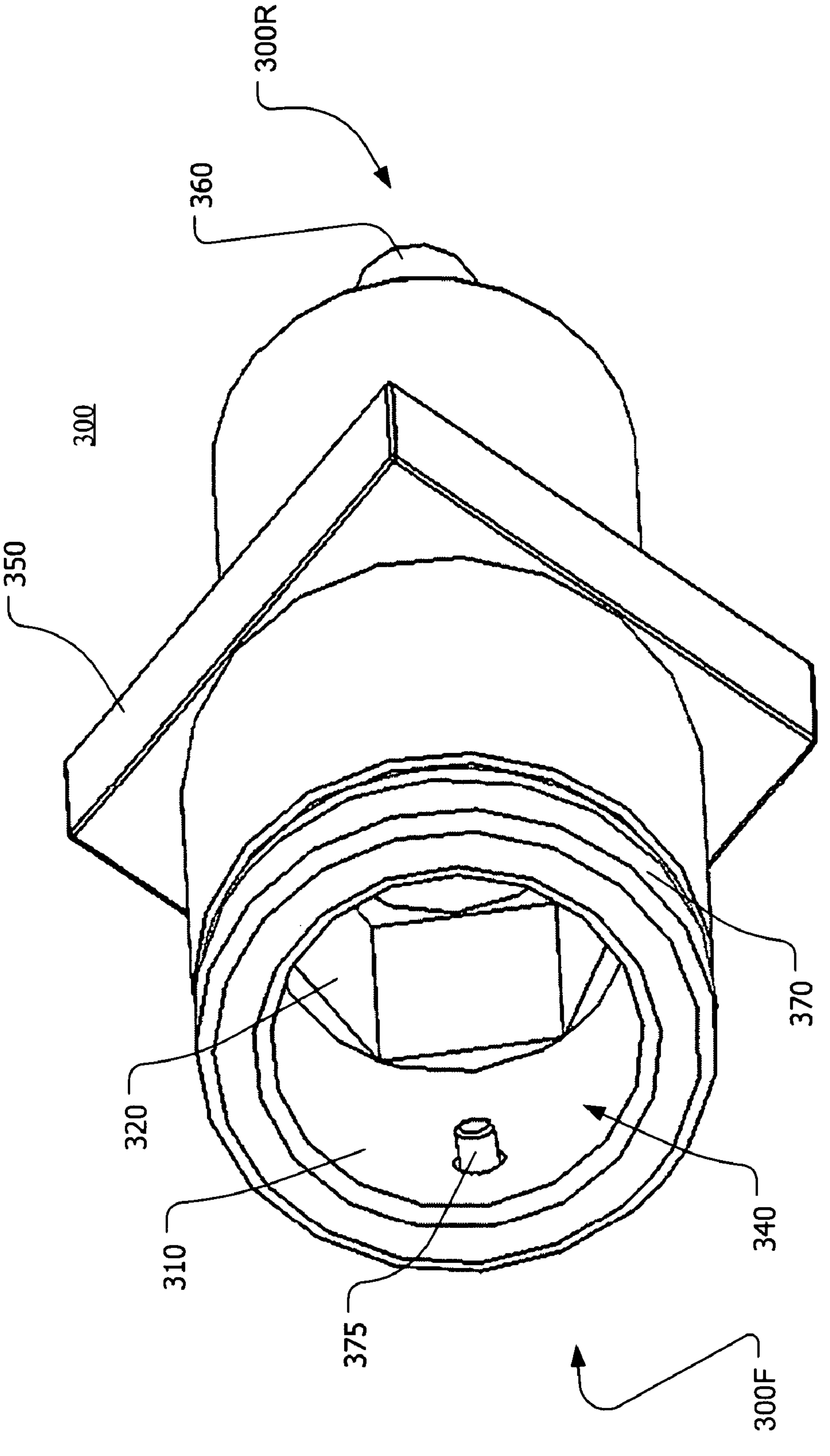
FIG. 3 is a perspective view of a receiver.

Referring now to FIG. 3 there is shown a perspective view of a receiver 300 for a punch down tool, which may be the receiver 115 of the punch down tool 110 (FIG. 1).

The receiver 300 has a rigid elongate body having a forward end 300F and a rearward end 300R. The receiver 300 has an opening 310 disposed forward-most of the receiver 300. The opening 310 may have a circular cross-section and be sized appropriately to accommodate standard blades. From the opening 310, a cavity 340 may extend into the receiver's body toward the rearward end 300R. The cavity 340 may have a cross-sectional shape and depth sufficient to accommodate standard double-ended blades. The cavity 340 near the opening 310 may be round and have a ⅜" diameter.

The cavity 340 may include a female coupling 320 complementary to the coupling of a work end adapter. For example, to complement the hexagonal coupling 220 of the work end adapter 200, the coupling 320 may be a socket having a hexagonal cross-section which is the same size as the coupling 220, but just slightly larger to allow for ease of insertion and removal. On the other hand, if the work end adapter 200 has a female coupling, then the receiver 300 should have a complementary male coupling.

The receiver may have a pin 375 affixed diametrically into the opening 310. The pin may be a short, thin section of wire which normally extends a distance $d_p$ into the opening 310, where $d_p > d_g$. Also, $d_p$ may be less than $d_d$. The pin 375 is disposed on the receiver 300 and the groove 230 is disposed on the work end adapter 200 to be complementary, such that they engage when the work end adapter 200 is moved into the receiver 300. The pin 375 is biased into the opening 310, but may be at least partially movable out of the opening 310 during insertion of the work end adapter 200 into the receiver 300. That is, the pin 375 may press against the groove 230. The detent portion 235 in the groove 230 may be positioned so that the pin 375 will drop into the detent portion 235 when the work end adapter 200 is properly seated into the receiver 300. Furthermore, the size, shape and location of the pin 375 and the detent portion 235 may be selected to also require some extra force to remove the work end adapter 200 from the receiver 300, such as an amount of force greater than in normal use of the tool system 100 for work but small enough that a user can conveniently pull the work end adapter 200 from the receiver 300. To provide these various forces on the pin 375, the pin 375 may be one end of a C-spring 370 on the outside of the receiver 300 and spaced some distance back from the opening 310.

The receiver 300 may further include a central portion 350. The central portion 350 may have a square cross-section for secure installation into the body of the punch down tool, and a back face (hidden in FIG. 3) against which a spring of the hammer assembly may press.

The rearward end 300R may have a portion 360 having a reduced diameter which rests against the hammer assembly's hammer.

The receiver may have a magnet (shown schematically in FIG. 5) as an alternative or in addition to the magnet 270 of the work end adapter 200. However, it may be better to have the magnet in the work end adapter 200, since it may be undesirable to introduce magnetic fields when working with blades.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments. As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. An apparatus comprising:

a work end adapter comprising a rigid elongate body having a forward end and a rearward end, the forward end having a cavity having first and second portions, the first portion having a hexagonal cross-section and being located at a first depth and adapted to matingly receive hexagonal bits;

the second portion having an open section with two opposing ears and being located at a second depth greater than the first depth and adapted to matingly receive finned shaft bits;

the rearward end having a first coupling having a non-circular cross-section, and a groove extending along the outside of the rearward end and including a detent portion.

2. The apparatus of claim 1 further comprising:

a punch down tool having a forward end and a rearward end, the punch down tool comprising:

an elongate body comprising a hand grip;

a receiver secured into the forward end of the punch down tool, the receiver having an opening disposed forward-most of the receiver, the opening having a circular cross-section;

a cavity extending from the opening into the receiver toward the rearward end of the punch down tool;

a second coupling complementary to the first coupling of the work end adapter; and a pin affixed diametrically into the cavity, wherein the pin and the groove of the work end adapter are adapted to engage when the work end adapter is moved into the receiver, and the pin is biased into the opening and movable at least partially out of the opening during insertion of the work end adapter into the receiver.

3. The apparatus of claim 2 further comprising a hammer assembly for delivering an impact to the receiver and including a lockout to prevent the hammer assembly from delivering the impact.

4. The apparatus of claim 2 further comprising a C-spring on the outside of the receiver around the opening and including the pin.

5. The apparatus of claim 2 wherein the receiver further comprises a magnet.

6. The apparatus of claim 2 wherein the second coupling comprises a hexagonal socket.

7. The apparatus of claim 2 wherein the first coupling comprises a head having a hexagonal cross-section and the second coupling comprises a complementary hexagonal socket.

8. The apparatus of claim 1 wherein the work end adapter further comprises a magnet.

9. The apparatus of claim 1 wherein the first portion and the second portion of the forward end of the work end adapter are aligned.

10. A punch down tool having a forward end and a rearward end, the punch down tool comprising:

an elongate body comprising a hand grip;

a work end adapter for receiving bits and having a groove;

a receiver secured into the forward end of the punch down tool, the receiver having an opening disposed forward-most of the receiver, the opening having a circular cross-section;

a cavity extending from the opening into the receiver toward the rearward end of the punch down tool, the cavity acting as a coupling having a forward section and a rearward section, wherein the forward section is generally circular and the rearward section is non-circular;

a pin affixed diametrically into the cavity, wherein the pin is adapted to engage the groove of the work end adapter when the work end adapter is moved into the receiver, and the pin is biased into the cavity and movable at least partially out of the opening during insertion of the work end adapter into the receiver; and a hammer assembly for delivering an impact to the receiver and including a lockout to prevent the hammer assembly from delivering the impact.

11. The apparatus of claim 10 further comprising a C-spring on the outside of the receiver around the opening and including the pin.

12. The apparatus of claim 10 wherein the receiver further comprises a magnet.

13. The apparatus of claim 10 wherein the work end adapter further comprises a magnet.

14. The apparatus of claim 10 wherein the forward section of the receiver and the rearward section of the receiver are aligned.

15. The apparatus of claim 10 wherein the rearward section of the coupling comprises a hexagonal socket.

* * * * *

UNITED STATES PATENT AND TRADEMARK OFFICE

CERTIFICATE OF CORRECTION

PATENT NO. : 8,220,135 B2
APPLICATION NO. : 12/479618
DATED : July 17, 2012
INVENTOR(S) : Vogel et al.

Figure 4:
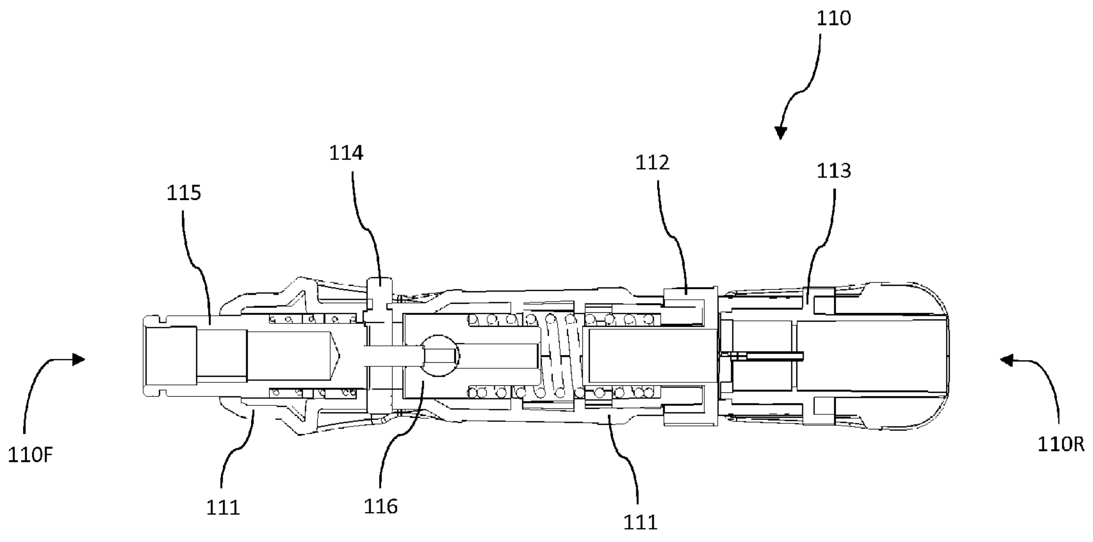
FIG. 4 is a schematic representation of an aspect of the invention.

It is certified that error appears in the above-identified patent and that said Letters Patent is hereby corrected as shown below:

In the Drawings, Figure 4 should be replaced by the following:

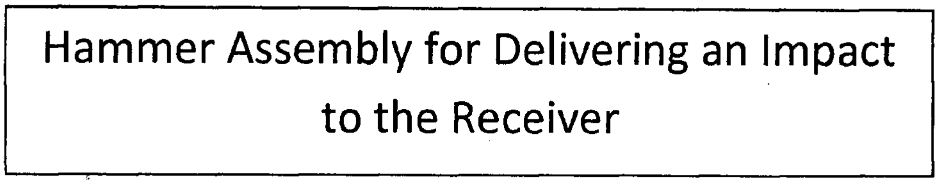

FIG. 4

Figure 5:
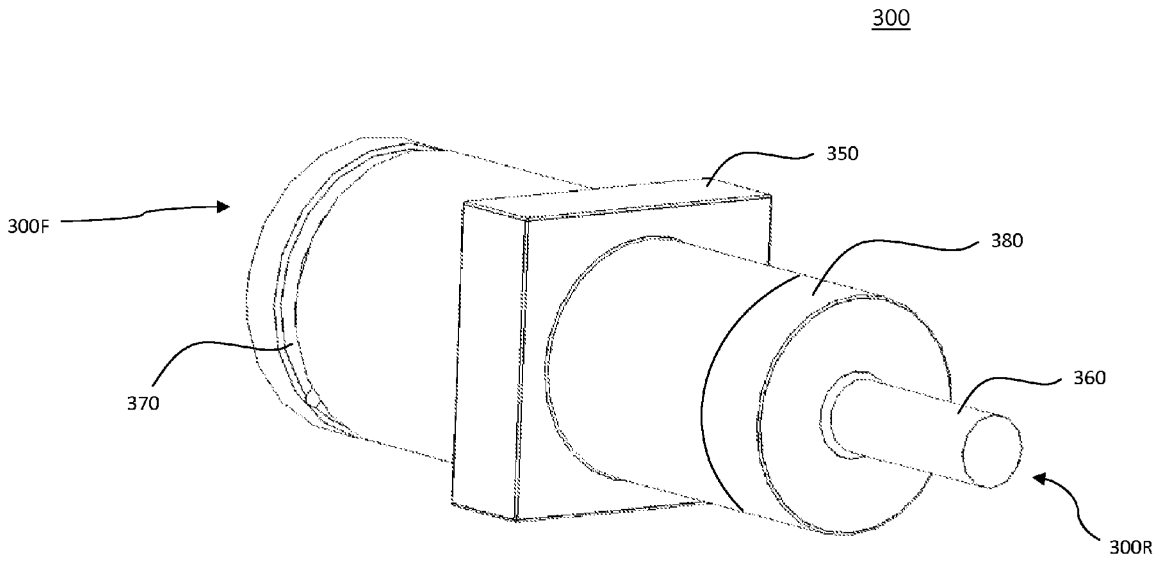
FIG. 5 is schematic representation of another aspect of the invention.

In the Drawings, Figure 5 should be replaced by the following:

FIG. 5

Signed and Sealed this
Twenty-third Day of April, 2013

Teresa Stanek Rea
*Acting Director of the United States Patent and Trademark Office*